(12) United States Patent
Bahns et al.

(10) Patent No.: US 6,977,052 B1
(45) Date of Patent: Dec. 20, 2005

(54) CHECK DISK FOR OPTICAL DATA STORAGE DISK MANUFACTURING

(75) Inventors: Ted L. Bahns, White Bear Lake, MN (US); Barry E. Brovold, St. Paul, MN (US); Donald J. Kerfeld, St. Paul, MN (US)

(73) Assignee: Imation Corp, Oakdale, MN (US)

( * ) Notice: Subject to any disclaimer, the term of this patent is extended or adjusted under 35 U.S.C. 154(b) by 563 days.

(21) Appl. No.: 10/050,299

(22) Filed: Jan. 18, 2002

(51) Int. Cl.⁷ .............................................. B29D 17/00
(52) U.S. Cl. ...................... 264/1.33; 264/1.9; 264/2.5
(58) Field of Search ................................ 264/1.1, 1.33, 264/1.36, 1.38, 2.5, 40.1; 430/321; 369/53.2, 369/53.41

(56) References Cited

U.S. PATENT DOCUMENTS

| | | | |
|---|---|---|---|
| 3,565,978 A | | 2/1971 | Folger et al. |
| 4,374,077 A | | 2/1983 | Kerfeld |
| 4,726,006 A | | 2/1988 | Benne et al. |
| 4,729,938 A | | 3/1988 | Tajima et al. |
| 5,149,607 A | | 9/1992 | De Graaf et al. |
| 5,274,618 A | * | 12/1993 | Henmi et al. ............ 369/53.31 |
| 5,458,985 A | | 10/1995 | Isono et al. |
| 5,528,577 A | * | 6/1996 | Maenza ..................... 369/53.27 |
| 5,586,109 A | | 12/1996 | Inui et al. |
| 5,597,613 A | | 1/1997 | Galarneau et al. |
| 5,688,447 A | * | 11/1997 | Hong ........................ 264/1.33 |
| 5,852,508 A | * | 12/1998 | Kubota et al. ............... 359/355 |
| 6,190,838 B1 | | 2/2001 | Kerfeld |
| 6,194,129 B1 | * | 2/2001 | Kasono et al. .............. 430/320 |
| 6,277,545 B1 | * | 8/2001 | Iida et al. ................... 430/320 |
| 6,635,896 B1 | * | 10/2003 | Hirono et al. ............. 250/559.4 |

FOREIGN PATENT DOCUMENTS

| | | | |
|---|---|---|---|
| EP | 0 358 276 | | 3/1990 |
| EP | 0 424 218 | * | 4/1991 |
| FR | 2 676 577 | | 11/1992 |
| JP | 57-172553 | | 10/1982 |
| JP | 59-114031 | | 6/1984 |
| JP | 62-095749 | | 5/1987 |
| JP | 64-86345 | * | 3/1989 |
| JP | 01-301880 | | 12/1989 |
| JP | 3-037842 | | 2/1991 |
| JP | 7-57305 | * | 3/1995 |

(Continued)

OTHER PUBLICATIONS

Dill, F. et al., "Characterization of Positive Photoresist," *IEEE Transactions on Electron Devices*, ED-22, No. 7, pp. 445-452 (Jul. 1975).

(Continued)

*Primary Examiner*—Melvin Mayes
(74) *Attorney, Agent, or Firm*—Eric D. Levinson

(57) ABSTRACT

In one embodiment, the invention is directed to a manufacturing process for optical data storage disks that makes use of a check disk very early in the production cycle. The check disk can be replicated directly from the master without destroying the master. The check disk may then be tested in order to validate the pattern created on the master. In some cases, the check disk may be delivered to customers, allowing the customers to verify the check disk. Once the check disk has been verified, the master can be used to create one or more stampers, which can be used in a mass production process for creating optical data storage disks. However, if the check disk is defective or otherwise not acceptable, the production cycle can be halted prior to creating any stampers. In this manner, the invention can be used to avoid creation of defective stampers or other defective mass production tools.

21 Claims, 11 Drawing Sheets

FOREIGN PATENT DOCUMENTS

| JP | 9-097452 | 4/1997 |
|----|----------|--------|
| JP | 9-138981 | 5/1997 |
| WO | WO 97/12279 | 4/1997 |
| WO | WO 99/52105 | 10/1999 |

OTHER PUBLICATIONS

Trefonas, P., et al., "New Principle for Image Enhancement in Single Layer Positive Photoresists," Proc. for SPIE, 771, pp. 194-206 (Mar. 1987).

Horigome et al., "Novel stamper process for optical disc," Optical Storage Technology and Applications, Proceedings of SPIE-The International Society for Optical Engineering, Los Angeles, CA, Jan. 12-15, 1998, vol. 899, XP 000010872, pp. 123-128.

Nakamura, Shigeru et al., "High Density Recording for Magneto-optical Disk Drive," *IEEE Transactions on Magnetics*, 34, No. 2, pp. 411-413 (Mar. 1998).

* cited by examiner

CHECK DISK FOR OPTICAL DATA STORAGE DISK MANUFACTURING

TECHNICAL FIELD

The invention relates to the production of data storage media such as optical data storage disks.

BACKGROUND OF THE INVENTION

Optical data storage disks have gained widespread acceptance for the storage, distribution and retrieval of large volumes of information. Optical data storage disks include, for example, audio CD (compact disc), CD-R (CD-recordable), CD-ROM (CD-read only memory), DVD (digital versatile disk or digital video disk) media, DVD-RAM (DVD-random access memory), and various types of rewritable media, such as magneto-optical (MO) disks, CD-RW (CD-rewritable) and phase change optical disks. Some newer formats for optical data storage disks are progressing toward smaller disk sizes and increased data storage density. In some cases, optical data storage disks are housed within a data storage cartridge.

The process of creating optical data storage disks such as prerecorded disks, recordable disks or rewritable disks begins with a mastering process. For example, the mastering process involves making a master that has a surface pattern that represents encoded data on the master surface. The surface pattern, for instance, may be a collection of features that define master pits and master lands. The mastering process is a relatively expensive process in which a photoresist is coated on a master substrate, exposed to develop a photoresist pattern, and then removed in the exposed or non-exposed regions to define a photoresist pattern.

After creating a suitable master, that master can then be used to make a stamper. The stamper has a surface pattern that is the inverse of the surface pattern encoded on the master. For example, one technique that can be used to create a stamper involves depositing a thin nickel layer on the patterned master surface. Then, in an electroplating process, a nickel structural layer can be uniformly plated onto the nickel coated surface of the master. When the electroplating process is complete, the nickel layers can be collectively removed from the master to form a nickel stamper. This process, however, typically destroys the master.

The stamper can be used to create large quantities of replica disks in a mass production process, such as a rolling bead process or an injection molding process. In a rolling bead process, a bead of photopolymer is positioned between a substrate and the stamper. A roller passes over the substrate and the stamper, dispersing the bead of photopolymer and forcing air to the leading edge of the bead. After the roller has passed over the substrate and the stamper and dispersed the photopolymer, the photopolymer can be cured with ultraviolet (UV) light. The stamper is then peeled back, leaving an inverted image of the stamper within the photopolymer that is cured to the substrate. A reflective material, a phase change material, a magneto-optic material, or the like can then be deposited on the photopolymer. Additional protective layers may also be added.

In an injection molding process, the stamper is inserted within an injection molding tool, and the injection molding tool can be used to injection mold large quantities of molded replica disks. The injection molding tool typically includes mirror blocks positioned on both sides of a mold cavity. The stamper can be vacuum drawn against one of the mirror blocks and hot molten thermoplastic can be injected into the mold cavity. The molten thermoplastic conforms to the mold cavity, defining an inverse of the pattern preserved on the stamper. Upon cooling, the molded thermoplastic may contain the data and tracking information that was encoded on the master and preserved in the stamper. A reflective material, a phase change material, a magneto-optic material, or the like can then be deposited on the molded part according to the desired optical data storage disk format. Additional protective layers may also be added.

SUMMARY

In general, the invention is directed to a manufacturing process for optical data storage disks that makes use of a check disk very early in the production cycle. The check disk can be replicated directly from the master without destroying the master. The check disk may then be tested in order to validate the pattern created on the master. In some cases, the check disk may be delivered to customers, allowing the customers to verify the check disk. Once the check disk has been accepted, the master can be used to create one or more stampers, which can be used in a mass production process for creating optical data storage disks. However, if the check disk is defective or otherwise not acceptable, the production cycle can be halted prior to creating any stampers. In this manner, the invention can be used to avoid creation of defective stampers or other defective mass production tools.

In one embodiment, the invention is directed to a technique that includes creating a first generation check disk from a master without destroying the master and testing the check disk. A first generation stamper can then be created from the master if the check disk is acceptable. If the check disk is not acceptable, a new master can be created. In that case, the process of creating the new master may include adjusting master feature geometries to account for errors determined during the testing of the check disk.

A second generation stamper can be created from the first generation stamper, and the second generation stamper may be used in a mass production replication process such as a rolling bead process or an injection molding process. The replica disks created using the second generation stamper have substantially the same pattern as the check disk. In other words, the first generation check disk and third generation replica disks may have feature patterns that are the same "gender." For this reason, the check disk may be used to predict the quality of the feature patterns associated with replica disks created using a second generation stamper.

The invention may be capable of providing several advantages. For example, the invention may eliminate the creation of defective or incorrect stampers during the production cycle of optical data storage disks. In addition, the invention can eliminate the creation of a large number of defective optical data storage disks. In this manner, costs associated with the production cycle of optical data storage disks may be reduced.

In addition, the invention may be used to provide feedback to customers very early in the production cycle of optical data storage disks. For example, customers seeking production of a large number of optical data storage media in ROM format, or any other format, may benefit from the ability to test or verify a check disk before the additional time and energy is undertaken to create stampers and initiate the mass production of replica disks. In some cases, the creation of a check disk from a master may take less than approximately one hour. Thus, the check disk may be provided to customers more quickly than mass-produced replica disks, allowing the customer to make more informed and expedited decisions regarding mass production.

Additional details of these and other embodiments are set forth in the accompanying drawings and the description below. Other features, objects and advantages will become apparent from the description and drawings, and from the claims.

DETAILED DESCRIPTION

Figure 1:
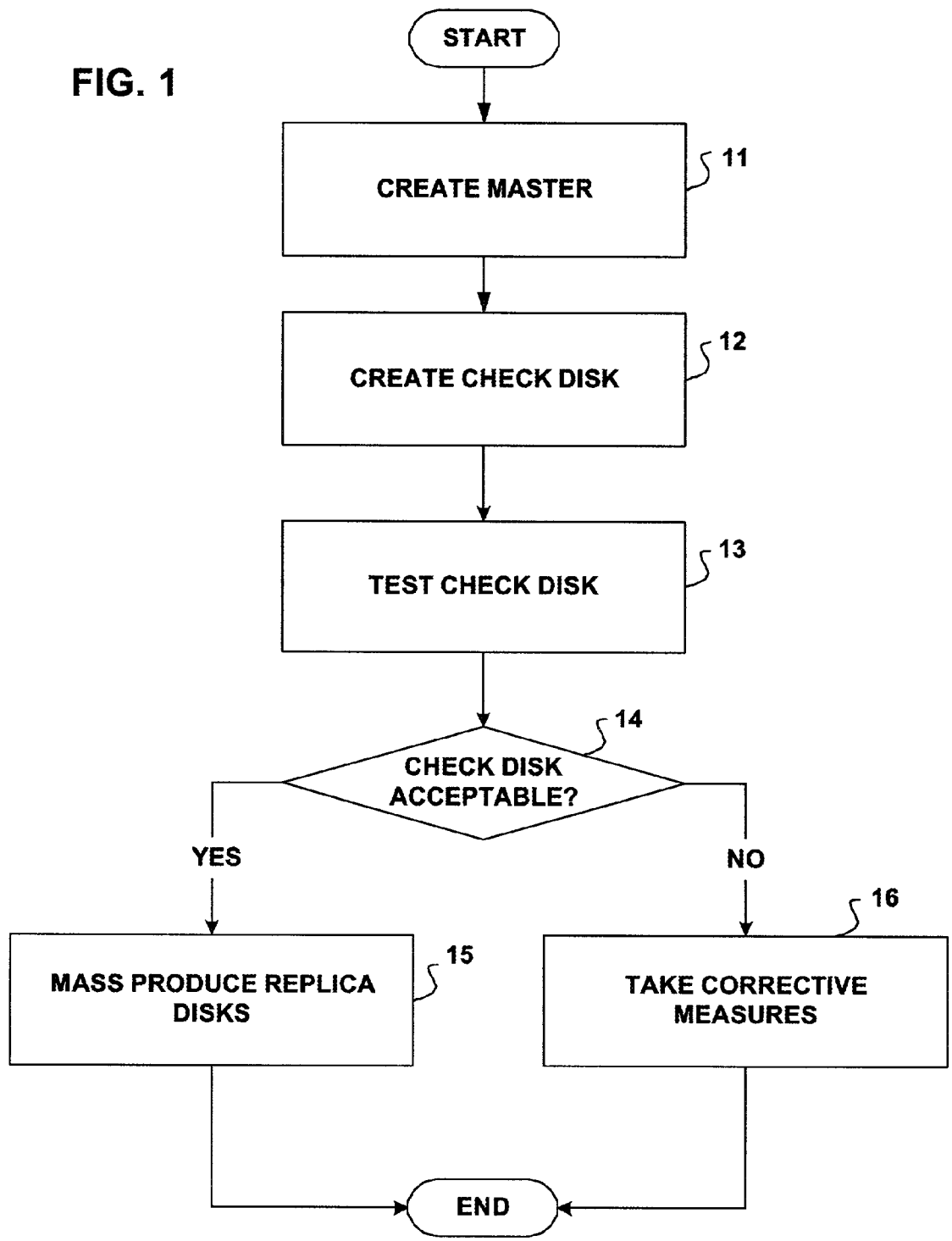
FIG. 1 is a flow diagram illustrating a process of using a check disk according to an embodiment of the invention.

FIG. 1 is a flow diagram according to an embodiment of the invention. As shown, a master is created (11). Many mastering techniques are known in the art, and typically involve coating a photoresist on a master substrate, exposing the coated master substrate to expose a photoresist pattern, and then removing the photoresist in the exposed or non-exposed regions. Mastering techniques are used to define the pattern (or the inverse of the pattern) that is eventually replicated into optical data storage disks.

After the master has been created, a check disk is created from the master without destroying the master (12). More specifically, the creation of the check disk occurs prior to the creation of mass production replication tools, such as metal stampers, that can be used in an injection molding process or a rolling bead process. As described in greater detail below, the process of creating a check disk may involve coating a master surface with a release layer and coating a photopolymer layer on a check disk substrate. The photopolymer layer can be made to contact the master surface coated with the release layer, and the photopolymer layer can be cured to bond the photopolymer layer to the check disk substrate and to preserve an inverse pattern of the master surface in the photopolymer layer. The photopolymer layer can then be separated from the release layer and materials can be deposited on the photopolymer layer according to the desired optical data storage disk format.

Additionally, the creation of the check disk (12) may include cutting the disk to size. For example, in some cases, the master surface may represent an oversized surface with patterns present in one or more portions of the master surface. In that case, the disk may need to be cut to size, such as by die punching the check disk with the desired outer diameter. A center hole may also be die punched. The check disk may be cut to size either before or after material is deposited on the photopolymer layer according to the desired format. Furthermore, copending and commonly assigned application Ser. No. 09/906,357, filed Jul. 16, 2001, now U.S. Pat. No. 6,638,692, describes a production process that creates a number of distinct information regions on a master disk, with every information region corresponding to a pattern for a replica disk smaller than the master. In that case, check disks may be created for each region of the master by creating a large check disk structure that preserves an inverse of all of the distinct information regions, and then cutting each of a number of check disks from the large check disk structure. The entire content of application Ser. No. 09/906,357, now U.S. Pat. No. 6,638,692, is incorporated herein by reference.

Once the check disk is created (12), it can be tested in order to determine whether the master has accurate feature geometries (13). As outlined in greater detail below, many factors may be tested in order to determine whether the master is acceptable. Advantageously, the testing of the check disk may occur prior to the creation of mass production replication tools such as stampers or other tools. In this manner, the processes of creating mass production replication tools can be avoided if the master proves defective or otherwise unacceptable.

In other words, if the check disk is not acceptable (14), corrective measures can be taken (16) prior to the creation of mass production replication tools. For example, corrective measure may involve creating a new master or possibly altering the original master. In some cases, data obtained in testing the check disk can be used to adjust the mastering process in order to ensure that a newly created master does not have the same defects as the original master. For example, if the check disk does not meet specification, then the mastering process may be adjusted to correct problems measured in the check disk. In that case, a new master may be created.

If the check disk is acceptable (14), then the master may be presumed to have accurate feature geometries. In that case, mass production of replica disks can be performed (15). For example, the same master that was used to create the check disk can be used to create one or more stampers. The stampers, then, can be used in a mass production process such as an injection molding process or a rolling bead process to replicate a large number of optical data storage disks. Alternatively, a first generation stamper can be created from the master and used to create one or more second generation stampers. The second generation stampers may then be used in the mass production process. In either case, when a check disk verifies the integrity of the master, the likelihood that replicated optical data storage disks will be defective is reduced.

For two-sided optical data storage disks, masters are typically created for each side of the disk. In that case, check disks can be created and tested for the masters corresponding to each side of the two-sided optical data storage disk to be created. If either of the check disks are defective or otherwise not acceptable, the master associated with the defective check disk can be replaced or altered, possibly using data obtained in testing the check disks.

The invention may be used to reduce costs associated with the production cycle of optical data storage disks by avoiding the creation of stampers or replica disks from a defective master. The creation of stampers, for example, may require significant time and energy. However, if the master is defective, the master defects will likely be passed on to stampers. By providing a check disk prior to the creation of the stamper, the invention may be used to avoid the scenario where a defective master is used to create a defective stamper. In some cases, the check disk may be inserted within a disk drive to determine whether it is functional. If it is functional, then there is a high likelihood that disks replicated using second generation stampers of the master will also be functional.

Figure 2:
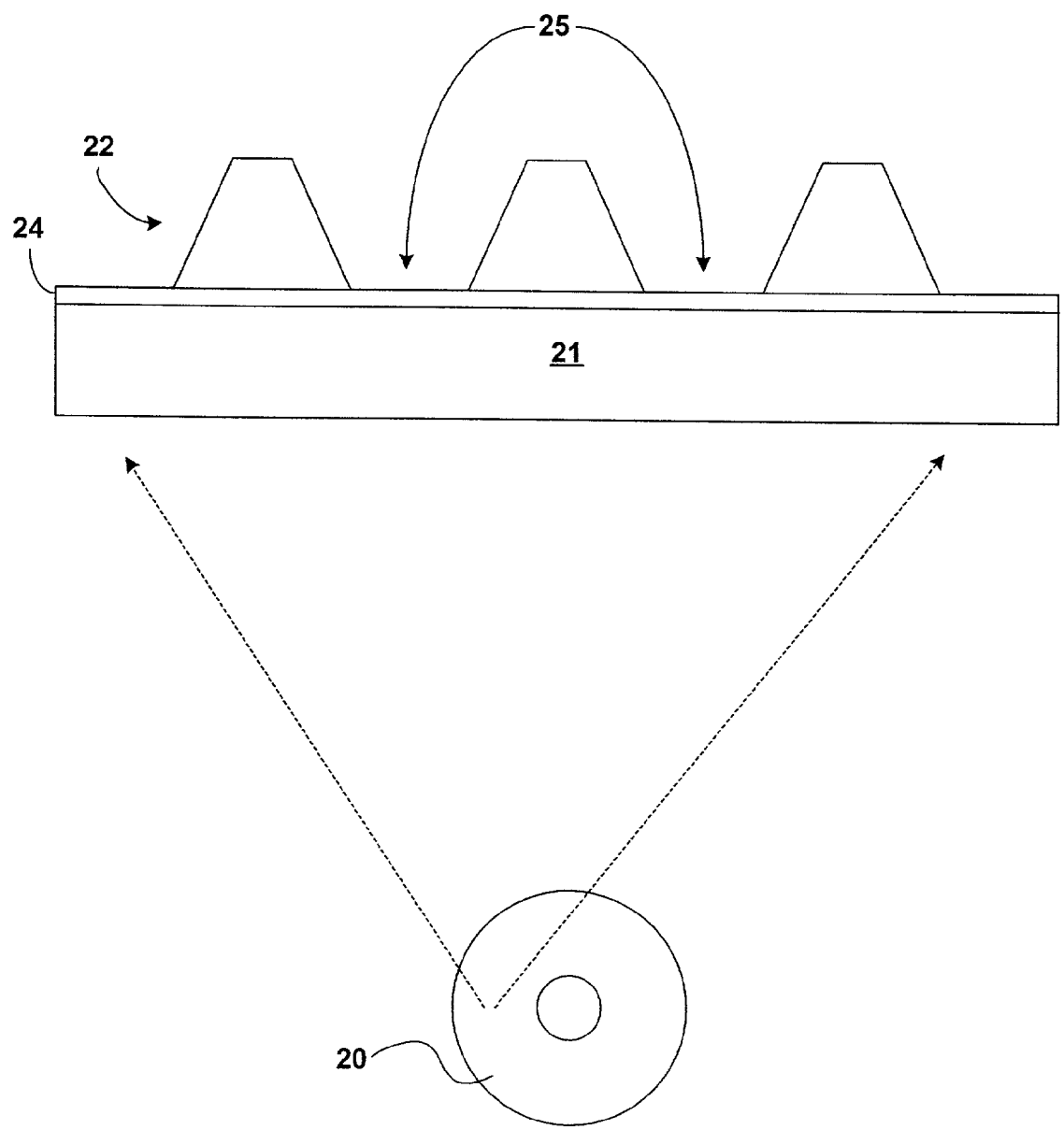
FIG. 2 shows an exemplary master in the form of master disk that may be used to create a check disk in accordance with an embodiment of the invention.

FIG. 2 shows an exemplary master in the form of master disk 20 that may be used to create a check disk in accordance with an embodiment of the invention. For illustrative purposes, an enlarged cross sectional view of a small portion 21 of an exemplary master disk 20 is shown. Master disk 20 may include a master information layer 22, e.g., formed by spin coating a layer of photoresist onto a bonding layer 24. The thickness of the information layer 22, e.g., 20–200 nanometers, can be varied according to the spin speed and the photoresist solution.

After spin coating a layer of photoresist onto the bonding layer 24, the master 20 can then be placed on a laser beam recorder, e.g., laser beam exposure table. The laser can then be shuttered on and off as the master disk is spun at a desired speed to expose the photoresist to the laser beam. The on and off shuttering of the laser beam can be made representative of the data to be encoded on information layer 22, for instance, forming the desired features 25 on the master disk 20.

After exposing the master disk 20 to the laser, master disk 20 may undergo a development process. For instance, in an exemplary embodiment, sodium hydroxide and water are dispersed across the master disk 20 as it rotates, and the photoresist is etched away by the solution in the areas where the photoresist was exposed to the laser beam. In this manner, the desired pattern of features can be encoded on the master disk 20.

To increase the durability of the master disk 20, it may be passed through a ultraviolet (UV) exposure process and/or a baking process after the development process. Baking the master disk 20, for instance, may strengthen cross-linking of the photoresist in the information layer 22, improving and increasing the bond strength of the photoresist to bonding layer 24. By way of example, a baking time of approximately one hour at 100 degrees Centigrade may be suitable, although the actual temperature and bake time may vary according to the type of photoresist that is used.

Figure 3:
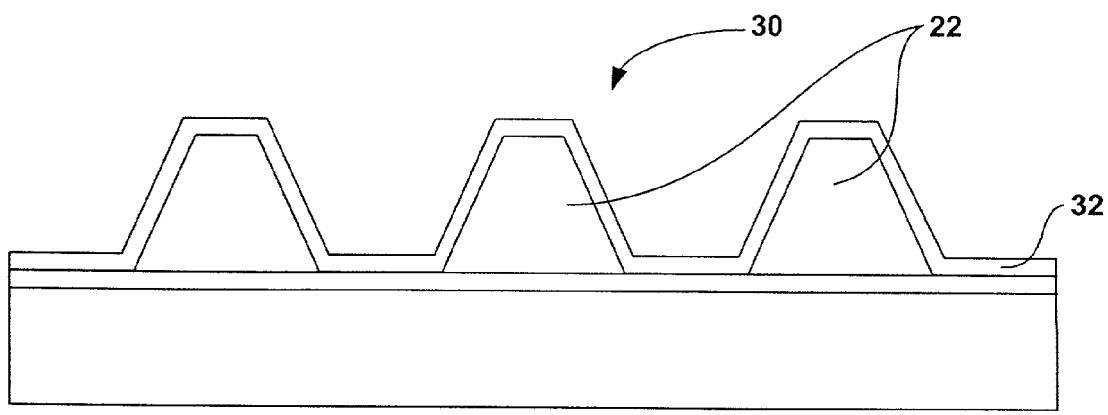
FIG. 3 is an enlarged cross sectional view of a small portion of an exemplary master that may be used to create a check disk in accordance with an embodiment of the invention.

FIG. 3 is an enlarged cross sectional view of a small portion of an exemplary master 30 that may be used to create a check disk in accordance with an embodiment of the invention. After developing and baking master 30, the information layer 22 of master 30 may be coated with a relatively thin release layer 32, e.g., 20 nanometers of a metal such as nickel or chromium. The release layer 32 can act as a barrier so that the creation of a check disk will not destroy the master. Additionally, release agents may be coated on the surface of release layer 32 to further ensure that the master will not be destroyed during the creation of the check disk. For example, if release layer 32 is comprised of nickel, release agents such as a fluoro-chemical in isopropyl alcohol may be coated on the nickel surface.

Figure 4:
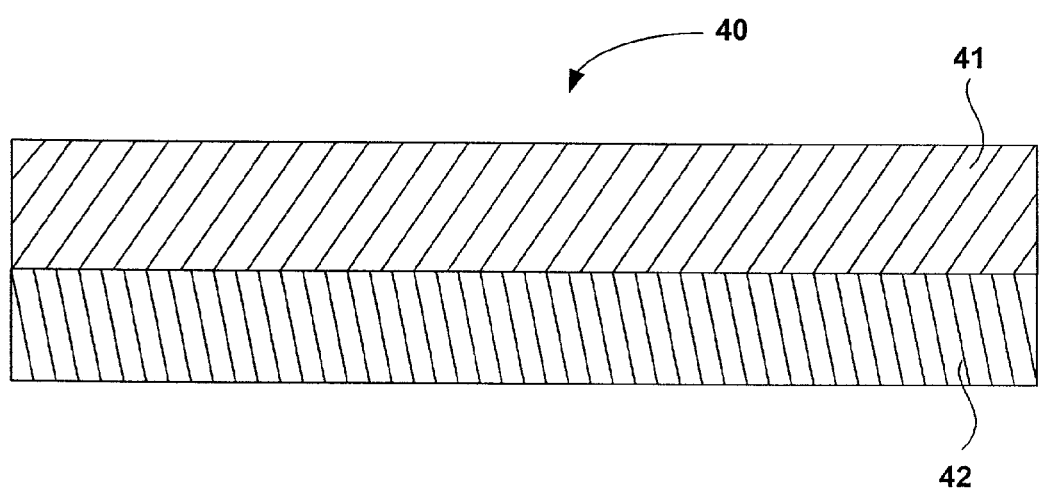
FIG. 4 is an enlarged cross sectional view of a structure that can be formed into a check disk.

FIG. 4 is an enlarged cross sectional view of structure 40 that can be formed into a check disk. Structure 40 includes a check disk substrate 42 coated with a photopolymer layer 41. For example, photopolymer layer 41 can be spin coated on check disk substrate 42. Alternatively, coating the photopolymer layer 41 can be achieved during a rolling bead process in which a bead of photopolymer is simultaneously distributed and patterned. Check disk substrate 42 may comprise any suitable substrate material such as metal, glass, silicon, or a polymer. In one specific case, check disk substrate 42 may comprise polymethylmethacrylate (PMMA) having a thickness of approximately 0.6 millimeters.

FIG. 4 is not necessarily drawn to scale. For instance, the thickness of photopolymer layer 41 is typically negligible when compared to the thickness of check disk substrate 42. Thus, a desired thickness of check disk substrate 42 may be chosen to match the thickness of replica disks ultimately being created. In one example, the thickness of photopolymer 41 may be on the order of 10 microns.

Suitable photopolymers for use in photopolymer layer 41, for instance, include HDDA (4×6×) polyethylenically unsaturated monomer-hexanediol diacrylate; chemlink 102 (3×) monoethylenically unsaturated monomer-diethylene glycol monoethyl ether acrylate, elvacite 2043 (1×3×) organic polymer-polyethylmethacrylate, and irgacure 651 (0.1×0.2) latent radical initiator-2,2-dimethoxy-2-phenylacetophenone. Another suitable photopolymer includes HHA (hydantoin hexacryulate) 1×, HDDA (hexanediol diacrylate) 1×, and irgacure 651 (0.1×0.2) latent radical initiator-2,2-dimethyoxy-2-phenylacetophenone. These or other photopolymers may be used in accordance with the invention.

Figure 5:
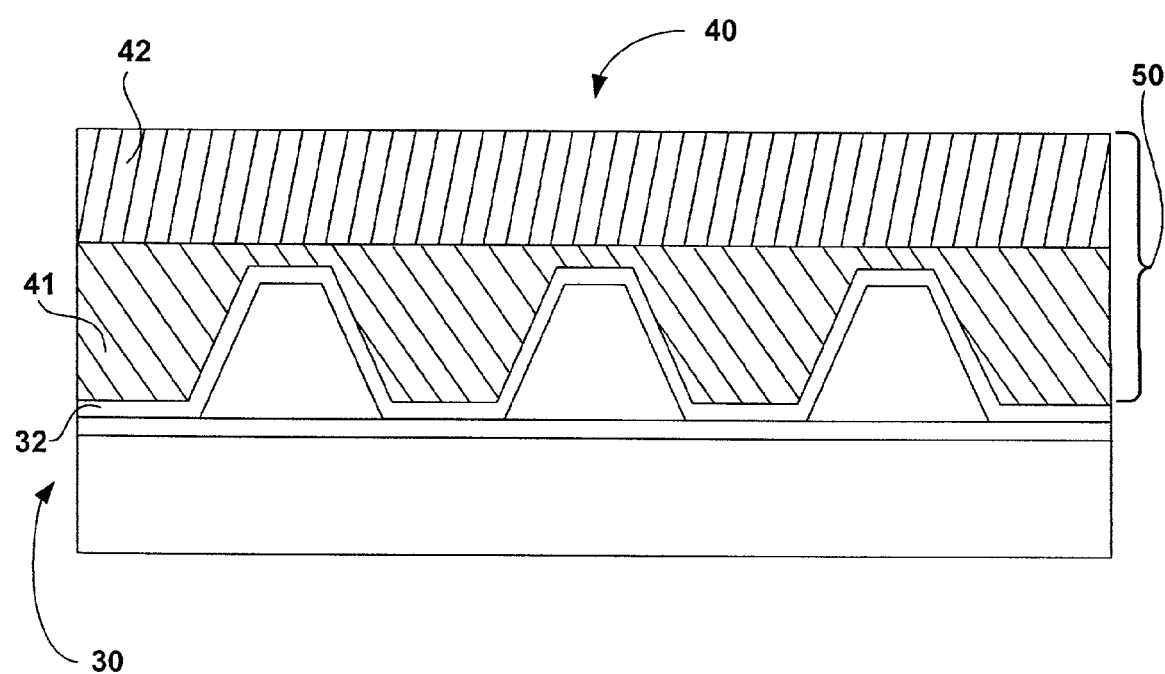
FIGS. 5–7 are enlarged cross sectional views illustrating the creation of a check disk.
Figure 6:
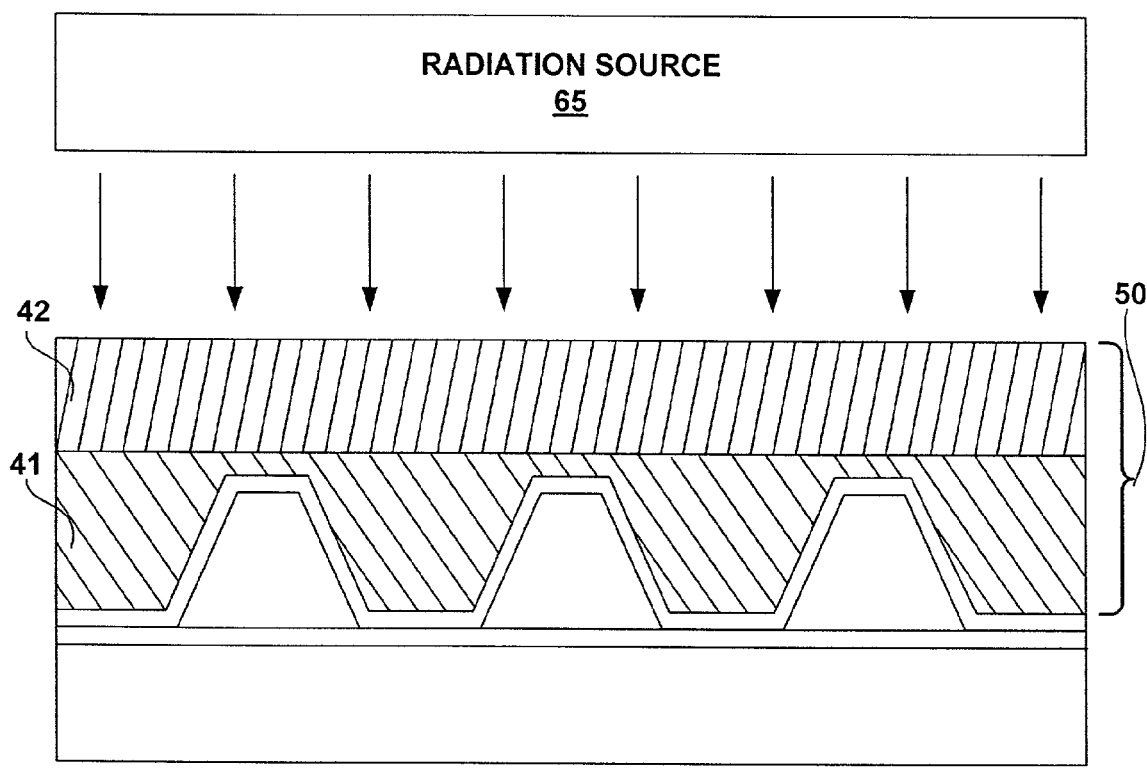

FIGS. 5 and 6 are enlarged cross sectional views illustrating the creation of a check disk 50. The creation of check disk 50 may involve pressing structure 40 (FIG. 4) against the release layer 32 of master 30 (FIG. 3). For example, a roller (not shown) may be used to force the photopolymer layer 41 of structure 40 against the release layer 32. In that case, the rolling bead process is used to simultaneously coat and pattern photopolymer layer 41 on substrate 40. The roller passes over the substrate 42 and the master 30, dispersing the bead of photopolymer and forcing air to the leading edge of the bead. In this manner, the photopolymer layer 41 can be distributed so as to define an inverse of the feature geometry encoded on the surface of master 30.

As shown in FIG. 6, a radiation source 65 such as an ultra violet (UV) radiation source can then be used to cure the photopolymer layer 41 so as to define a surface pattern of the check disk 50. In one example as illustrated, radiation source 65 may cause radiation to pass through substrate 42 in order to cure photopolymer layer 41. In that case, substrate 42 may comprise a transparent material such as a transparent polymer. In some cases, curing the photopolymer layer 41 may take place without masking edges of the photopolymer layer 41 to ensure that the photopolymer layer 41 is cured to substantially the entire surface of substrate 42. Any non-uniformity at the edges can be cut away by cutting the check disk to size, such as by die punching or laser cutting. Eliminating edge masking of photopolymer layer 41 may improve the curing process.

Figure 7:
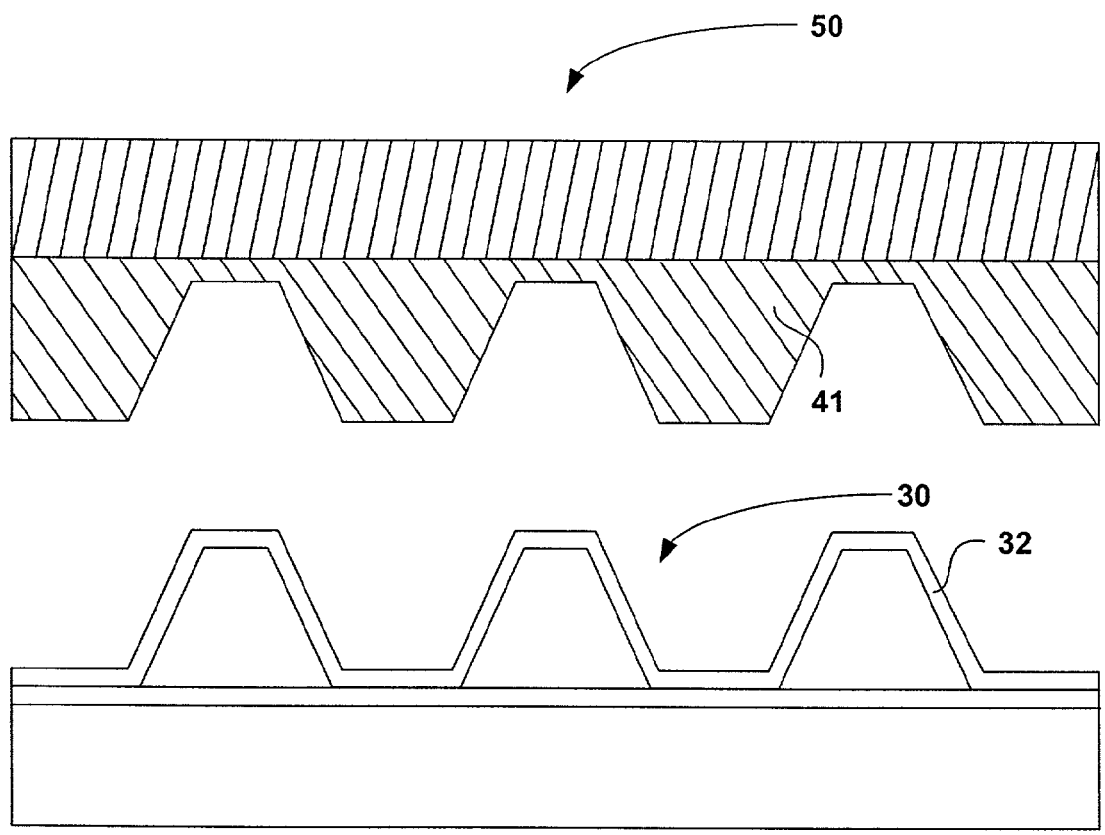

As illustrated in FIG. 7, once photopolymer layer 41 has been cured to define a surface pattern of check disk 50, the photopolymer layer 41 can be separated from release layer 32. Specifically, the separation of check disk 50 and master 30 may be facilitated by the presence of release layer 32 and may be enhanced by additional release agents coated on release layer 32. In either case, the separation may be non-destructive to master 30.

Figure 8:
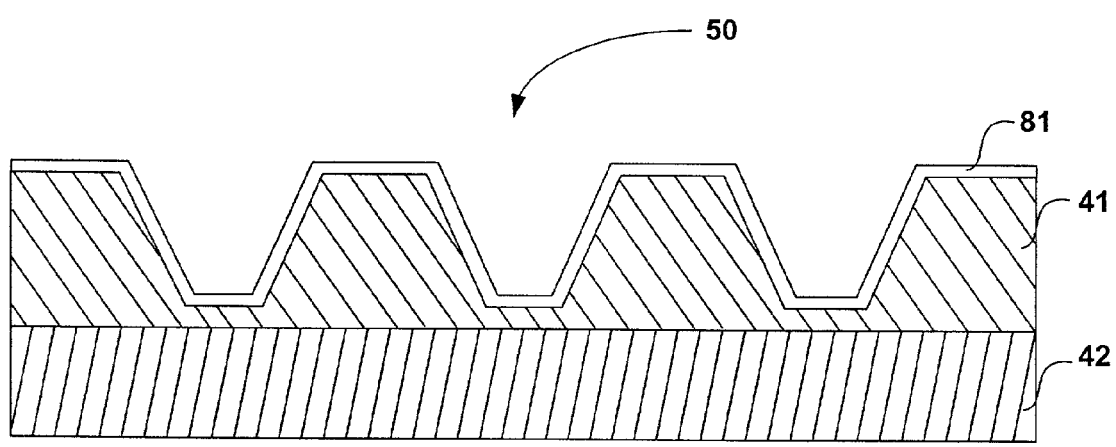
FIG. 8 is an enlarged cross sectional view of a check disk having an information layer deposited on its surface.

As illustrated in FIG. 8, one or more information layers 81 may then be deposited on the photopolymer layer 41 of check disk 50 according to the desired format. For example, one or more reflective materials, phase change materials, magneto-optic materials, or other media format materials may be deposited on photopolymer layer 41. One or more protective layers may also be added. If needed, check disk 50 can be cut to size and a center hole may also be cut into check disk 50. For example, die punching, laser cutting, or the like can be used to cut check disk 50 to size. At this point, check disk 50 may be a readable (and possibly a recordable) optical data storage medium. Alternatively, check disk 50 can be cut to size prior to deposition of the one or more information layers 81. Also, for some formats, check disk 50 may be housed in a data storage cartridge assembly, or the like.

In accordance with the invention, check disk 50 can be tested to determine whether it is functional, and whether it meets specification. In other words, the specification can provide criteria to quantify whether the check disk is acceptable. Other criteria could also be used to quantify when the check disk is acceptable. In any case, the feature geometries of check disk 50 can be tested to provide an indication whether the master has accurate feature geometries. Information layer 81 of check disk 50 may also be tested.

More specifically, check disk 50 can be tested for one or more of a number of data storage disk specifications including but not limited to read back signals in terms of parameters such as push-pull, jitter, burst error rate (BER), asymmetry, carrier noise ratio (CNR), or any other parameter that can be measured to assess the quality or functionality of check disk 50. Other parameters may also be tested. Indeed, the tested parameters may be different depending on the format of media being created.

Push-pull refers to an open loop measurement of the signal strength of the tracks (lands and grooves) as they sweep radially across a detector. Push-pull is typically related to the signal strength for tracking the disk. Jitter refers to a quantification of the edge-to-edge repeatability of the digital data stream decoded from the disk. Jitter is often reported in a statistical manner to identify the degree of separation of discrete digital marks on the disk. BER refers to a measure of the error level on the disk. For many specifications, BER should be low enough to allow a comfortable margin for error correction. Asymmetry refers to the DC offset of the smallest mark compared with the largest mark on the disk. Asymmetry may be measured for read only signals, writable signals, or both. CNR refers to the ratio of signal strength in the frequency domain relative to the noise level on the disk. CNR is often used to quantify the quality of writable disks. Other parameters may also be tested in accordance with the invention.

It can be advantageous to test check disk 50 prior to creating any mass production tools such as stampers. If check disk is inadequate or defective, then mass produced replica disks will likely be inadequate or defective. Check disk 50 can be used to identify problems very early in the production cycle, and possibly avoid the creation of defective stampers or other mass production tools.

In addition, check disk 50 may be delivered to customers, allowing customers to verify its functionality and possibly test for defects. For example, customers may verify content stored on the check disk. In addition, customers may verify the files or formats stored on check disk 50, such as encryption features or other security features. Customers may also verify ID codes or bands that may be formed on the inner or outer edges of check disk 50. If provided, customers may even verify customized graphics or visual watermarks, such as those described in commonly assigned U.S. Pat. Nos. 5,946,286 and 5,607,188.

Check disk 50 can be created much more quickly than mass production replica disks. In some cases, check disk 50 can be created in less than approximately one hour after creating or receiving master 30. Thus, check disk 50 can be used to provide feedback to customers and assure customers of the integrity of replica disks that will be created during the mass production process.

Once check disk 50 has been tested and accepted, the feature pattern 25 of master 30 can be presumed to be accurate. At this point, mass production tools can be created from master 30. More specifically, master 30 may be used to create a stamper or a family of stampers. For example, metal stampers or plastic stampers may be created as outlined in greater detail below.

In general, a stamper created from the master is referred to as a first generation stamper. A stamper created from a first generation stamper is referred to as a second generation stamper. A stamper created from a second generation stamper is referred to as a third generation stamper, and so fourth. The check disk is a first generation check disk created directly from the master. Thus, if substantially the same feature pattern exhibited by the check disk are desired for replica disks, second generation stampers may be used to create the replica disks. In that case, third generation replica disks would have substantially the same feature pattern as the first generation check disk, e.g., feature patterns having the same gender.

Figure 9:
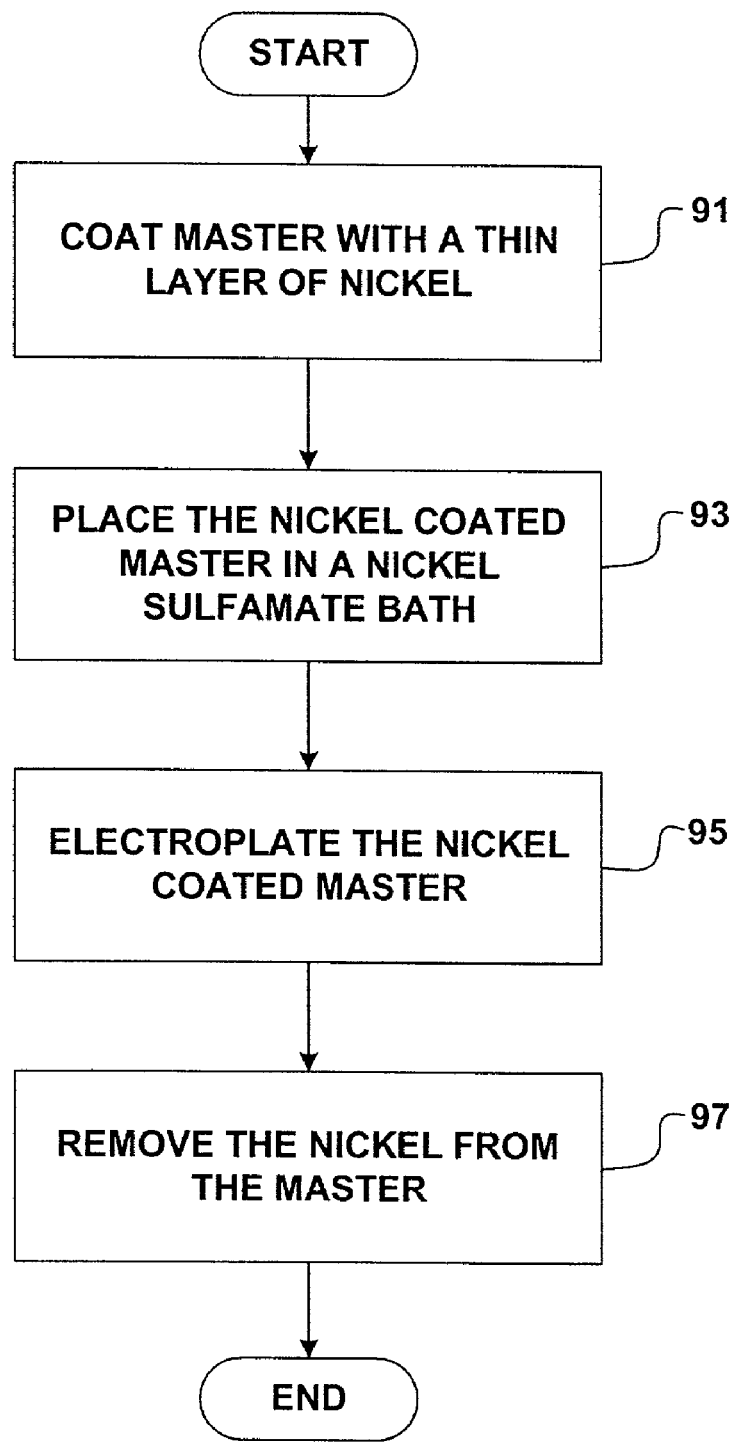
FIG. 9 is a flow diagram illustrating a process for creating a metal stamper from a master.

FIG. 9 is a flow diagram illustrating a process for creating a metal stamper from a master. The process of FIG. 9 is an exemplary stamper creation process that may form part of a larger manufacturing process that makes use of the check disk as outlined above. The process of creating the metal stamper may include an electroplating process. By way of example, FIG. 9 illustrates the process of creating a nickel stamper, although other metals could be used. As shown, a nickel stamper may be created from a master by coating the master with a thin layer of nickel (91). In that case, the thin layer of nickel may have already been coated on the master during the check disk creation process. The nickel coated master can then be placed in a nickel sulfamate bath (93), where it may be electroplated (95). For instance, electroplating (95) may cause a thick layer of nickel to solidify on the nickel coated master. The thick layer of nickel may be bonded to the thin layer of nickel that was coated on the master. Thus, both layers of nickel may collectively become a metal stamper that is removed from the master (97). Removing the nickel layers from the master (97), for instance, may destroy the master. If necessary, excess photoresist may be removed from the nickel through the application of a stripper chemical.

Figure 10:
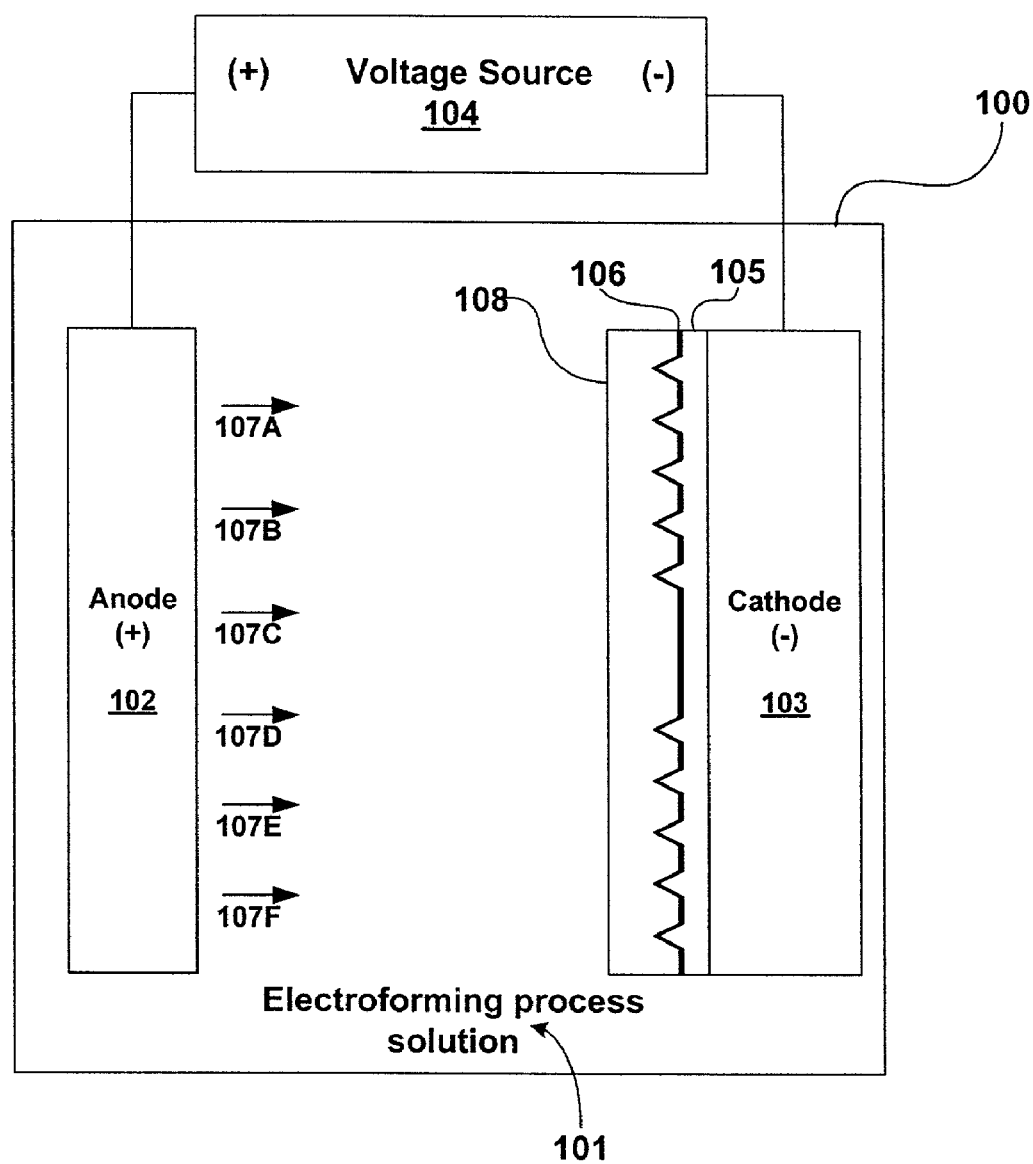
FIG. 10 is a block diagram illustrating an electroplating process that can be used to create a stamper once a check disk has been accepted.

FIG. 10 is a block diagram illustrating an electroplating process in more detail. Again, this electroplating process may form part of a larger manufacturing process that makes use of a check disk to determine whether the electroplating process should be undertaken for a given master. In the exemplary embodiment shown, the electroplating process makes use of an electroforming chamber 100, an electroforming process solution 101, one or more anodes 102, one or more cathodes 103, and a voltage source 104. Voltage source 104 has a positive terminal that is electrically coupled to anode 102 and a negative terminal that is electrically coupled to cathode 103. The nickel-coated master 105 is mechanically and electrically coupled to cathode 103, and as such, may become part of cathode 103 during the electroplating process. Cathode 103 and anode 102 are placed within electroforming chamber 100 so that they are submerged in electroforming solution 101.

For instance, anode 102 may be a nickel anode and cathode 103 may be made of copper. Electroplating process solution 101, for instance, may be a nickel sulfamate solution. A plurality of anodes in the form of nickel anode baskets, for instance, may be placed within the nickel sulfamate electroforming solution (only one anode 102 shown). In operation, cathode 103 may be rotated during the electroforming process. Voltage source 104 can be activated, and upon activation, nickel ions, indicated at 107A–107F may flow from anode 102 to cathode 103.

Everything on cathode 103 may be masked with nonmetallic material, except for a thin layer of nickel coated on the master 105 (indicated at 106). During the electroplating process, a nickel structural layer 108 is uniformly plated onto the nickel coated surface 106 of master 105. The electroplating process can be started with a slow current so that nickel is uniformly built up to a desired thickness on the nickel plated surface 106, e.g., a thickness of approximately 300 microns may be desirable. When the plating process is complete, the exposed surface of the nickel structural layer 108 can be polished. During the electroplating process, the thin layer of nickel 106 originally coated on the master 105 may become part of the nickel structural layer 108 to form a metal stamper.

Figure 11:
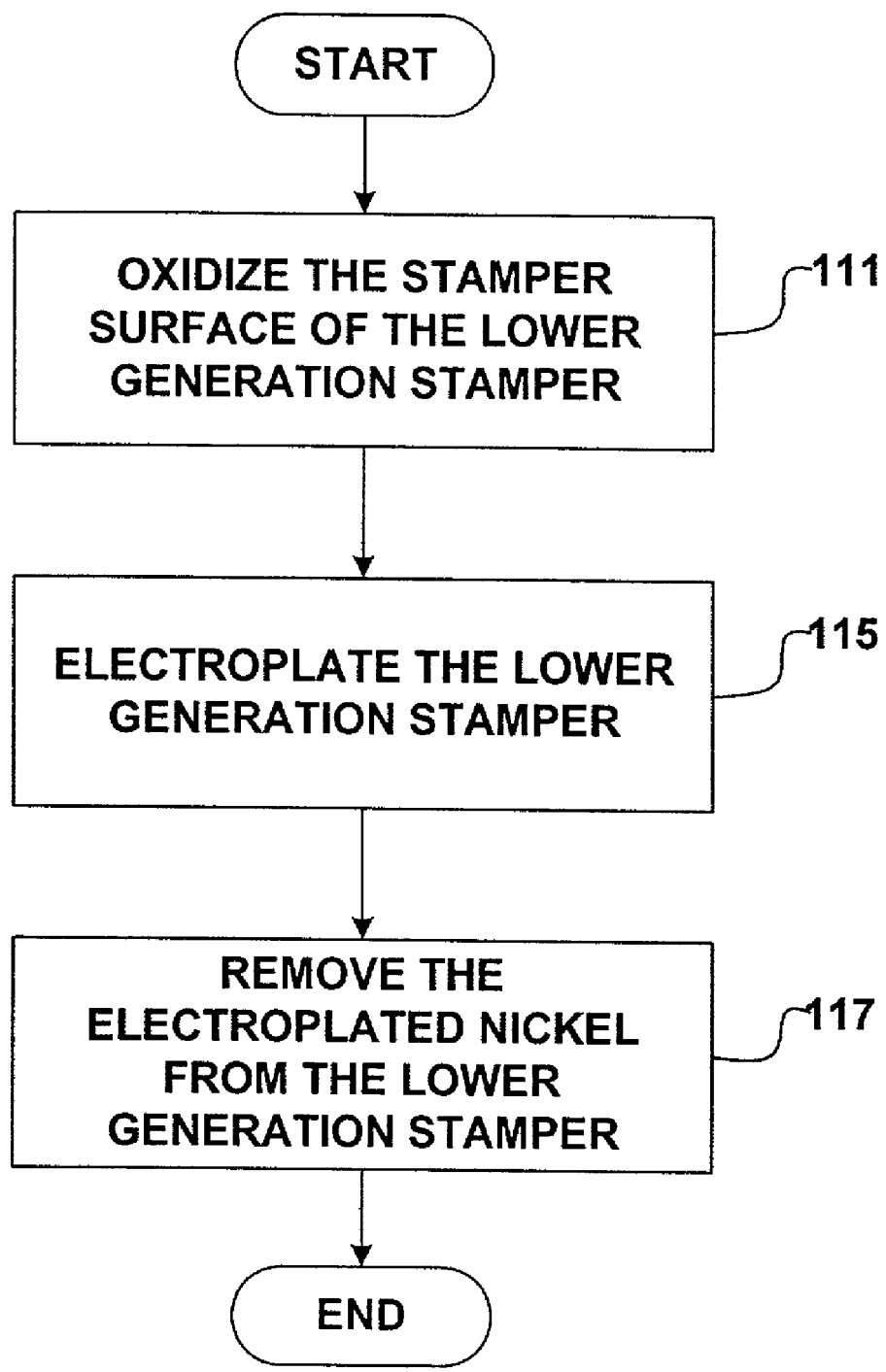
FIG. 11 is a flow diagram illustrating the process for creating a metal stamper from another metal stamper.

As mentioned, second generation stampers may be desirable once the check disk has been tested and verified because third generation replica disks created from a second generation stamper have feature patterns that are the same gender as the first generation check disk created from the master. FIG. 11 is a flow diagram illustrating the process for creating a metal stamper from another metal stamper. The process of FIG. 11 can be used to create a second generation metal stamper from a first generation metal stamper. Again, in accordance with the invention, the process of FIG. 11 may take place after the check disk has been accepted.

As shown, the stamper surface of the lower generation stamper may be oxidized (111). The lower generation stamper may then be exposed to an electroplating process (115) like that described above. The metal that bonds to the surface of the lower generation stamper may be removed from the lower generation stamper to create the higher generation stamper (117). Oxidizing the lower generation stamper (111), for instance, may ensure that the bond between the lower generation stamper and the higher generation stamper is weak. Therefore the higher generation stamper may be removed from the lower generation stamper.

The stamping process for creating replica disks involves making contact between the stamper and a replica disk, e.g., made of polycarbonate. For instance, the stamper may be pressed against a polycarbonate replica disk, or alternatively the stamper may form part of an injection mold that is filled with a molten polycarbonate that cools to form the replica disk. Additionally, the stamper may be used in a rolling bead process in which a photopolymer is distributed between a substrate and the stamper as a roller passes over the stamper. In that case, the photopolymer can be cured after being distributed. In any case, after making contact between the stamper and the replica disk, the stamper may be peeled away from the replica disk leaving an inverted image of the surface pattern of the stamper on the replica disk. This inverted image may include the desired surface pattern for the replica disk. Moreover, by verifying the feature pattern of a check disk, the probability of creating defective replica disks can be greatly reduced.

As mentioned above, plastic stampers may also be created. The process of creating plastic stampers is similar to the process of creating a check disk. Copending and commonly assigned U.S. application Ser. No. 09/778,482 filed Feb. 7, 2001, now U.S. Pat. No. 6,616,867, describes a number of different processes for creating plastic stampers and metal stampers. In accordance with the invention, these or other processes may be used to create stampers after the check disk has been tested and verified. The entire content of application Ser. No. 09/778,482, now U.S. Pat. No. 6,616,867, is incorporated herein by reference.

Figure 12:
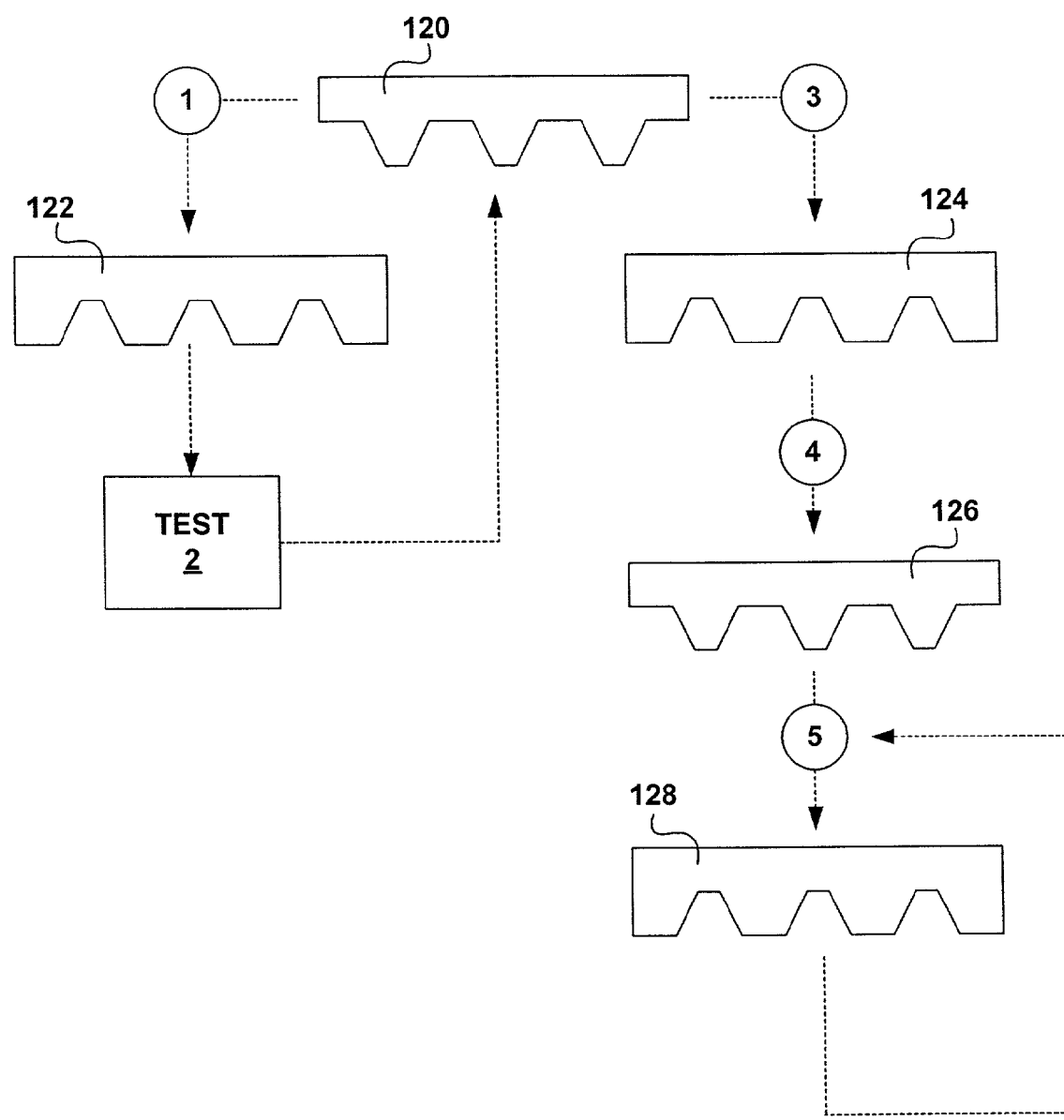
FIG. 12 is a diagram illustrating a mass production process of optical data storage disks according to an embodiment of the invention.

FIG. 12 is a diagram illustrating a mass production process for optical data storage disks according to the invention. Master 120 is used to create check disk 122 in process (1). Check disk 122 is then tested as illustrated in test process (2). If check disk 122 is defective or otherwise not acceptable, a new master can be created, possibly using data obtained in testing the check disk to adjust for errors exhibited in the feature pattern of master 120. Alternatively, if check disk 122 is acceptable, then master 120 can be used to create first generation stamper 124 as illustrated in process (3). First generation stamper 124 can then be used to create second generation stamper 126 as illustrated in process (4). Second generation stamper 126 can then be used to stamp one or more replica disks 128 as illustrated in process (5). More specifically, process (5) may comprise a mass production process that creates a large number of replica disks such as an injection molding process for molding thermoplastic optical disks, or a rolling bead process for distributing and curing a photopolymer on a replica disk substrate. Advantageously, the integrity of the large number of replica disks is more assured when check disk 122 has been tested and accepted.

Various embodiments of the invention have been described. For instance, techniques implementing a check disk in the production cycle of optical data storage disks have been described. Nevertheless, various modifications may be made without departing from the scope of the invention. For example, other techniques for creating a first generation check disk from a master without destroying the master may be used. Also, other techniques of testing the check disk may be used. In addition, other techniques of creating stampers may be used. Accordingly, other embodiments are within the scope of the following claims.

What is claimed is:

1. A method comprising:
   creating a first generation check disk from a master without destroying the master;
   testing the check disk; and
   creating a first generation stamper from the master when the check disk is acceptable, wherein creating the first generation check disk comprises:
   coating a master surface with a release layer;
   coating a photopolymer layer on a check disk substrate;
   contacting the photopolymer layer with the release layer;
   curing the photopolymer layer to bond the photopolymer layer to the check disk substrate and to preserve a pattern of the master surface in the photopolymer layer;
   separating the photopolymer layer from the release layer; and
   depositing at least one of the following on the photopolymer layer: a reflective material, a phase change material and a magneto-optic material.

2. The method of claim 1, wherein creating the first generation check disk further includes cutting the check disk to size.

3. The method of claim 1, further comprising curing the photopolymer layer without masking the photopolymer layer so that the photopolymer layer is cured to substantially the entire surface of the check disk substrate.

4. The method of claim 1, further comprising creating the master.

5. The method of claim 1, wherein testing the check disk includes testing feature geometries of the check disk.

6. The method of claim 1, wherein testing the check disk comprises testing the check disk against one or more criteria, wherein the check disk is acceptable when it satisfies the criteria.

7. The method of claim 1, wherein testing the check disk includes measuring read back signals in terms of at least one parameter selected from the group consisting of: push-pull, jitter, burst error rate (BER), asymmetry, and carrier noise ratio (CNR).

8. The method of claim 1, wherein the master is a first master, the method further comprising creating a second master when the check disk is not acceptable.

9. The method of claim 8, wherein the process of creating a second master includes adjusting master feature geometries to account for errors determined during the testing of the check disk.

10. The method of claim 8, further comprising:
creating another first generation check disk from the second master without destroying the second master;
testing the check disk created from the second master; and
creating a first generation stamper from the second master when the check disk created from the second master is acceptable.

11. The method of claim 1, further comprising:
creating a second generation stamper from the first generation stamper; and
using the second generation stamper in a mass production process to create a number replica disks.

12. The method of claim 11, wherein the replica disks have feature geometries substantially similar to the feature geometries of the check disk.

13. The method of claim 11, wherein the mass production process is an injection molding process.

14. The method of claim 11, wherein the mass production process is a rolling bead process.

15. The method of claim 1, further comprising:
creating first and second first generation check disks from first and second masters without destroying the masters, wherein each of the first and second check disks respectively correspond to one side of a two-sided optical data storage medium;
testing the first and second check disks; and
creating first and second first generation stampers from the first and second masters when check disks are acceptable.

16. The method of claim 15, further comprising:
creating first and second, second generation stampers from the first and second first generation stampers; and
using the first and second, second generation stampers in a mass production process to create a number two-sided replica disks.

17. A method comprising:
creating a master;
creating a check disk from the master without destroying the master by:
coating a master surface with a release layer;
coating a photopolymer layer on a check disk substrate;
contacting the photopolymer layer with the release layer;
curing the photopolymer layer to bond the photopolymer layer to the check disk substrate and to preserve a pattern of the master surface in the photopolymer layer;
separating the photopolymer layer from the release layer; and
depositing at least one of the following on the photopolymer layer; a reflective material, a phase change material, and a magneto-optic material;
testing feature geometries of the check disk;
creating a first generation stamper from the master when check disk is acceptable;
creating a second generation stamper from the first generation stamper when the check disk is acceptable; and
using the second generation stamper in a mass production process to create a number replica disks when the check disk is acceptable.

18. The method of claim 17, wherein the master is a first master, the method further comprising creating a second master when the check disk is not acceptable, wherein the process of creating a second master includes adjusting master feature geometries to account for errors determined during the testing of the check disk.

19. The method of claim 18, further comprising:
creating another first generation check disk from the second master without destroying the second master;
testing the check disk created from the second master; and
creating a first generation stamper from the second master when the check disk created from the second master is acceptable.

20. A method comprising:
creating a first generation check disk directly from a master without destroying the master and prior to creating a first-generation stamper;
delivering the check disk to a customer; and
creating the first generation stamper from the master when the customer indicates acceptance of the check disk.

21. The method of claim 20, wherein creating the first generation check disk comprises:
coating a master surface with a release layer;
coating a photopolymer layer on a check disk substrate;
contacting the photopolymer layer with the release layer;
curing the photopolymer layer to bond the photopolymer layer to the check disk substrate and to preserve a pattern of the master surface in the photopolymer layer; and
separating the photopolymer layer from the release layer.

* * * * *